(12) United States Patent
Andrews

(10) Patent No.: US 6,697,845 B1
(45) Date of Patent: Feb. 24, 2004

(54) NETWORK NODE MANAGEMENT SYSTEM AND METHOD USING PROXY BY EXTENSIBLE AGENTS

(75) Inventor: Kenneth Andrews, Reston, VA (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/578,674

(22) Filed: May 25, 2000

(51) Int. Cl.⁷ .............................................. G06F 15/16
(52) U.S. Cl. ...................... 709/209; 709/208; 709/217; 709/223
(58) Field of Search ................................ 709/208, 209, 709/217, 223, 230, 229, 202

(56) References Cited

U.S. PATENT DOCUMENTS

| | | | |
|---|---|---|---|
| 5,561,769 A | * 10/1996 | Kumar et al. ............... | 709/202 |
| 5,678,006 A | * 10/1997 | Valizadeh et al. .......... | 709/229 |
| 6,003,077 A | * 12/1999 | Bawden et al. ............. | 709/223 |
| 6,028,881 A | * 2/2000 | Ackerman et al. ........... | 372/75 |
| 6,085,245 A | * 7/2000 | Kaycee et al. .............. | 709/224 |
| 6,192,034 B1 | * 2/2001 | Hsieh et al. ................ | 370/241 |
| 6,330,601 B1 | * 12/2001 | French et al. ............... | 709/223 |
| 6,404,743 B1 | * 6/2002 | Meandzija ................... | 370/254 |
| 6,488,209 B1 | * 12/2002 | Hunt et al. ................. | 510/18 P |
| 6,519,635 B1 | * 2/2003 | Champlin et al. .......... | 709/223 |

OTHER PUBLICATIONS

Daniel et al., "Agent Extensibility (AgentX) Protocol Version 1", Jan. 2000, pp 1–91 (RFC No. 2741).*

Heintz et al., "Definitions of Managed Objects for Extensible SNMP Agents", Jan. 2000, pp 1–20 (RFC No. 2742).*

Daniele et al., "Agent Extensibility (AgentX) Protocol Version 1", Jan. 2000, pp. 1–91, (FRC No. 2741).

Diversified Data Resources, Inc., "An Intorductory Overview of SNMP", 1999, pp. 1–32.

Case et al., "Protocol Operations for Version 2 of the Simple Network Management Protocol (SNMPv2)", Jan. 1996, pp. 1–29, (RFC No. 1905).

* cited by examiner

*Primary Examiner*—Patrice Winder
*Assistant Examiner*—Liang-che Wang
(74) *Attorney, Agent, or Firm*—Danamraj & Youst, P.C.; Craig A. Hoersten; V. Lawrence Sewell

(57) ABSTRACT

A node management method and system that supports multiple SNMP agents in a single platform (e.g., a network element or node) with capability to include the AgentX standard. An SNMP master agent and one or more subagents are provided for managing the node, and use the AgentX standard for communication therebetween. At least a select portion of a MIB associated with the management functionality of the managed node is supported by an SNMP peer agent that is proxied via an AgentX subagent (PSA).

7 Claims, 6 Drawing Sheets

NETWORK NODE MANAGEMENT SYSTEM AND METHOD USING PROXY BY EXTENSIBLE AGENTS

BACKGROUND OF THE INVENTION

1. Technical Field of the Invention

The present invention relates to management systems and, more particularly, to a system and method for managing an instrumented node using extensible agents within the Simple Network Management Protocol (SNMP) framework.

2. Description of Related Art

Telecommunications networks and computer networks have been steadily evolving in complexity and towards integration. It is not uncommon to encounter a vast number of complicated devices (e.g., servers, hubs, bridges, routers, brouters, switches, hosts, computers, advanced opto-electronic devices, various I/O peripherals and mass storage devices, et cetera, supplied by multitudes of third-party vendors) that are interconnected together in a seamless, interoperable network for performing myriad functions.

Coupled with the steady increase in network and device complexity, network management tools have also been concomitantly advancing. While several traditional network management tools such as "ping"; "rsh"; and "netstat" are readily available, their overall utility in the management of today's complicated devices is somewhat limited. Typically, it is required of current device and network management schemes to provide for monitoring and controlling a number of device/network variables such as status, hardware/firmware/software versions, port/interface information, bandwidth capability, etc. associated with particular network devices, in addition to regulate in some instances the differences between devices irrespective of their current state. Furthermore, current network management solutions are required to operate efficiently on networks of scale while avoiding the processing burden of remote login and execution.

Simple Network Management Protocol (SNMP) is an advanced network management framework that provides a standardized management system for collecting and manipulating device variables and parameters ("management information") and acting based thereon using standardized messaging. Essentially, SNMP operates based on a client/server relationship wherein the client program (called the manager) makes virtual connections to a server program (called the SNMP agent) which executes on a network device, and serves information to the manager regarding the device's status. A database, controlled by the SNMP agent, is referred to as the SNMP Management Information Base (MIB) and is comprised of a standard set of statistical and control values pertaining to the device variables.

SNMP's biggest strength is its widespread popularity—SNMP agents are available for network devices ranging from computers, to bridges, to modems, to printers. Additionally, because SNMP provides a flexible and standardized framework that operates like an application programming interface (API) to a network, different vendors can create their own network management products such as SNMP agents that can be tailored for specific devices.

Accordingly, it should be appreciated that the capability to support multiple SNMP agents in a single platform is advantageous for management purposes as more devices get added or upgraded within a network element. Conventionally, such capability is provided within the SNMP framework by employing what are known as community strings, which are flat text strings (i.e., community names) used to identify a "community" of agents that collectively support the MIB of a managed element. These community names allow portions of the SNMP MIB and its object subsets to be commonly referenced by the use of password-like constructs.

Several shortcomings and deficiencies exist in the conventional solutions to provide support of multiple SNMP agents in a single element. For example, it is required that the SNMP manager be aware that it is communicating with multiple processing entities, i.e., agents, associated with the managed element. Further, the manager may have to switch between community strings based on what it needs to retrieve. Also, the manager has to be re-configured each time when it switches between two community strings or between two independent, non-community agents. Thus, the purpose of managing the element as a single managed node is thwarted because the manager does not "see" the node as single platform, rather as a partitioned collection of agents.

Additionally, conventional community string-based multi-agent solutions do not easily adapt to the Agent Extensibility (AgentX) standard which allows for multiple subagents to be registered with a common master agent that is seen as a single SNMP entity by the manager.

SUMMARY OF THE INVENTION

Accordingly, the present invention is directed in one aspect to a node management scheme that advantageously supports multiple SNMP agents in a single platform (e.g., a network element or node) with the capability to include the AgentX standard such that these and other aforementioned deficiencies and shortcomings of the conventional solutions are overcome. An SNMP master agent and one or more subagents are provided for managing the node, which use the AgentX protocol for communication therebetween. At least a portion of a Management Information Base (MIB) associated with the management functionality of the managed node is supported by an SNMP peer agent that is proxied via an AgentX subagent (PSA). The PSA registers the MIB portion with the SNMP master agent via an AgentX registration message. When an SNMP manager sends an SNMP management request to the SNMP master agent, the SNMP master agent parses the SNMP management request into one or more AgentX protocol messages depending upon the subagents involved. If an object identifier (OID) involved in the SNMP management request is part of the MIB portion supported by the SNMP peer agent, the PSA receives the appropriate AgentX message and re-assembles it into an SNMP message that is forwarded to the SNMP peer agent. An SNMP response is generated by the SNMP peer agent accordingly, which is returned to the PSA for reassembly into an appropriate AgentX response. The SNMP master agent receives all AgentX responses from the subagents and parses/multiplexes them into a single SNMP management response that is transported to the SNMP manager.

In another aspect, the present invention is related to a method of effectuating management communication in a network management system for managing a node. The management system includes an SNMP master agent and at least one SNMP peer agent, wherein the master agent is operable with the AgentX protocol and the peer agent is operable with the SNMP. An AgentX PSA is also included for facilitating packet or Protocol Data Unit (PDU) conversion between the SNMP master and peer agents. During initialization, the PSA registers at the master agent a predefined portion of a MIB associated with the managed node wherein the predefined portion of the MIB is supported by the peer agent. When the PSA receives a plurality of AgentX PDUs/packets from the master agent relating to a request by the master agent that is directed towards accessing the predefined portion of the MIB, it re-assembles the AgentX packets into a plurality of SNMP PDUs/packets. Thereafter, the SNMP packets are forwarded by the PSA to the peer agent, which generates an appropriate SNMP response message responsive thereto. The SNMP message is transmitted back to the PSA which, upon receiving the SNMP response message from the peer agent, re-assembles it into one or more AgentX response PDUs/packets. The AgentX response PDUs are subsequently forwarded by the PSA to the master agent.

In yet another aspect, the present invention is directed to an SNMP-based management system for managing a node with AgentX capability. An SNMP manager is provided for generating an SNMP management request towards a SNMP master agent associated with the managed node. At least one SNMP peer agent is included for supporting a select portion of a MIB associated with the managed node. An AgentX protocol-based PSA is operably disposed between the SNMP master agent and the SNMP peer agent in accordance with the teachings of the present invention. A processing structure is available in the SNMP master agent to parse the SNMP management request into an AgentX protocol request message directed to the PSA and to re-assemble an AgentX protocol response message received therefrom into an SNMP management response. The PSA includes a protocol converter for re-assembling the AgentX protocol request message received from the SNMP master agent into an SNMP message directed to the SNMP peer agent and to re-assemble an SNMP response received therefrom into the AgentX protocol response message.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
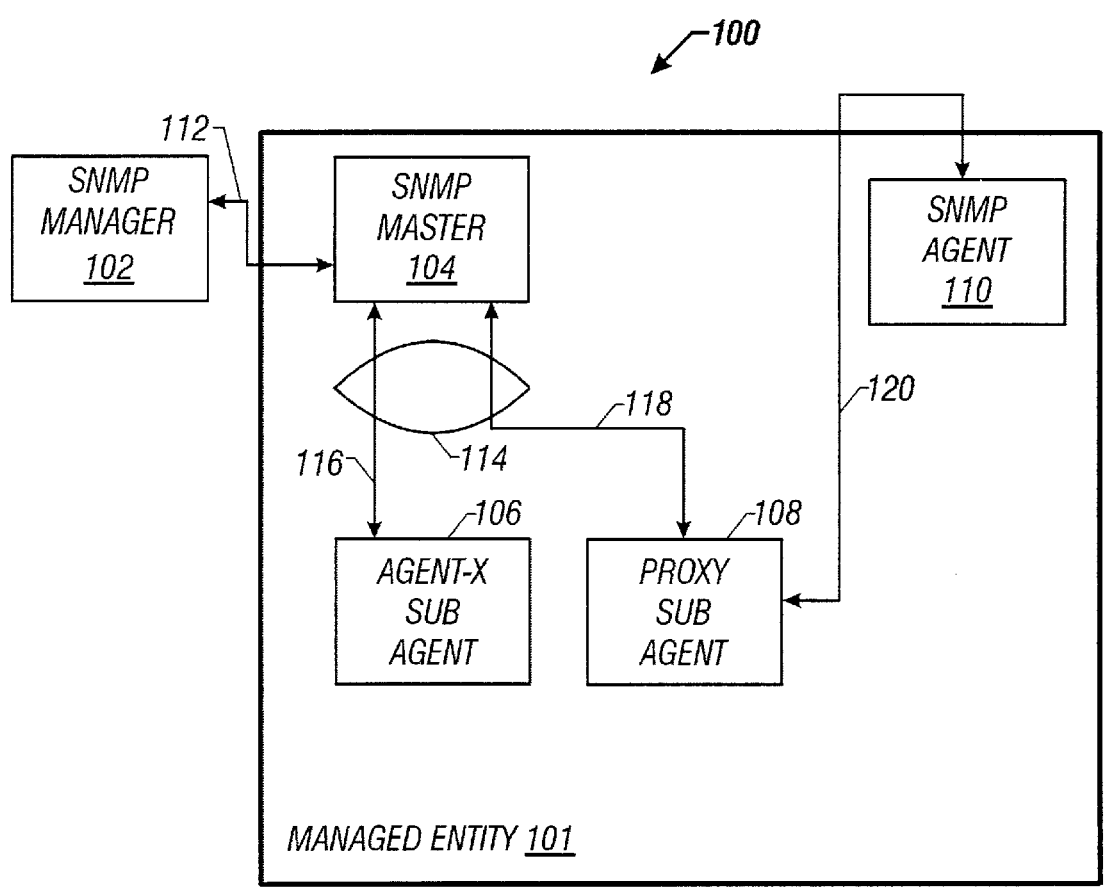
FIG. 1 depicts a functional block diagram of an exemplary embodiment of a node management system provided in accordance with the teachings of the present invention for managing a node.

In the drawings, like or similar elements are designated with identical reference numerals throughout the several views thereof, and the various elements depicted are not necessarily drawn to scale. Referring now to FIG. 1, depicted therein is an exemplary embodiment of a node management system 100 of the present invention for managing an entity (i.e., a managed node) 101. Because the teachings of the present invention are particularly exemplified in management systems operable with the SNMP methodology, a brief description thereof is set forth immediately hereinbelow.

An SNMP management system is comprised of one or more processing entities (i.e., agents), which have access to management instrumentation; at least one management station; and a standardized set of managed objects (i.e., management information) that can be queried using a standard message format with respect to managed elements or devices. Operations of the protocol are carried out under an administrative framework which defines authentication, authorization, access control, and privacy policies. Management stations execute management applications which monitor and control managed elements.

Management information, viewed as a collection of managed objects, resides in a virtual information store, i.e., the Management Information Base (MIB). Collections of related objects are defined in MIB modules and include values for monitoring managed entities' parameters such as, e.g., status, device interfaces supported, bandwidth, network activity based on Transmission Control Protocol (TCP), Internet Protocol (IP), or User Datagram Protocol (UDP), et cetera. Each manageable object is identified with an official name, and also with a numeric identifier expressed using the Abstract Syntax Notation One (ASN. 1), sometimes referred to as the "dot notation." The ASN-based definition of the manageable objects is termed the Structure of Management Information (SMI) associated with the SNMP management system.

The management protocol, i.e., SNMP, provides for the exchange of management messages among the various SNMP entities. The form of these messages is a message "wrapper" which encapsulates a Protocol Data Unit (PDU), wherein the form and meaning of the "wrapper" is preferably defined by the administrative framework of the management system.

Four types of SNMP operations are defined. Specific values can be fetched via a get request to determine the performance and state of a managed device. Typically, many different values and parameters can be determined via SNMP without the overhead associated with logging into the managed device, or establishing a TCP connection with the device. A get next or get bulk request may be used by a manager to "walk through" all SNMP values of a managed device in order to determine all names and values that the operant device supports. This is accomplished by beginning with the first SNMP object to be fetched, fetching the next name with a get next request, and repeating this process until an error is encountered, indicating that all MIB object names have been "walked." A get bulk allows the manager to walk through a portion of MIB with a single request although, internally, it may be treated a series of get next operations.

The SNMP standard provides for a method of effecting an action associated with a device via a set request to accomplish activities such as disabling interfaces, disconnecting users, clearing registers, etc. This capability provides a way of configuring and controlling network devices via SNMP. Lastly, a notification operation is defined, generated asynchronously by the managed devices, to notify a manager of a problem apart from any polling of the device.

As set forth above, the standard MIB includes various objects to measure and monitor a host of device parametrics, each of which is associated with an official name (such as sysUpTime, which is the elapsed time since a managed device was booted) and the corresponding dot-notation definition, which is the object identifier (OID) for sysUpTime). The SNMP MIB is arranged in a tree-structured fashion, similar in many ways to a disk directory structure of files, wherein the "leaf" objects of the tree provide actual management data regarding the managed node. Generally, SNMP leaf objects can be partitioned into two similar but slightly different types that reflect the organization of the tree structure: (i) discrete MIB objects which contain one precise piece of management data; and (ii) table MIB objects which contain multiple pieces of management data. Discrete MIB objects are often distinguished from table objects by adding a "0.0" (dot-zero) extension to their names.

The "." (dot) extension is sometimes referred to as the "instance" number of an SNMP object. Whereas the instance number is zero in the case of discrete objects, this number provides an index into the SNMP table object. In other words, the table objects allow parallel arrays of management information to be supported in the management system. For example, SNMP defines the ifDescr object (as a standard SNMP object) which indicates the text description of each interface supported by a particular device. Since equipment such as network devices can be configured with more than one interface, this object could be conveniently represented as an array.

The term "variable" refers to an instance of a non-aggregate object type defined according to the conventions set forth in the SMI. "Variable abinding" refers to the pairing of the name of a variable and its associated value. A variable-binding list (or "varbind" list) is a list of variable bindings defined for a particular management system. The name of a variable is an OID which is a concatenation of the OID of the corresponding object type together with an OID fragment identifying the instance. The OID of the corresponding object type is referred to as the OID prefix of the variable.

An SNMP entity may operate in a manager role or an agent role. An entity acts in an agent role when it performs SNMP management operations in response to received SNMP messages (other than an inform notification) or when it sends trap notifications. In a manager role, an entity initiates management operations by generating SNMP requests or when it performs operations in, response to received inform or trap notifications.

Several governing specifications standardized as Request For Comments (RFCs) are available regarding the SNMP management framework, wherein additional information may be found in greater detail. For example, an overall management architecture for SNMP is provided in RFC 2571. The SNMP message protocol is provided in RFC 1906, RFC 2572 and RFC 2574. A set of protocol operations and associated PDU formats is described in RFC 1905. These RFCs are incorporated by reference herein.

Continuing to refer to FIG. 1, in a presently preferred exemplary embodiment, the managed entity 101 may be comprised of a network element such as, for example, a host, router, terminal server, or a telecommunications node, et cetera. Accordingly, the terms "managed node," "managed entity," and "managed network element" will be used somewhat synonymously and interchangeably hereinafter for purposes of the present patent application. A plurality of SNMP entities are provided as part of the management system 100 with respect to the managed network element 101. An SNMP manager 102 is disposed for managing the element whose management information is realized by way of a suitable MIB (not shown in this FIGURE). The SNMP manager 102 preferably includes the capability to execute one or more functions such as alarm polling functions, trend monitoring functions, trap reception/filtering functions, etc., and may be comprised of a management tool set and a MIB compiler. Management information of the managed entity 101 is controlled via a plurality of processing entities, one of which operates as an SNMP master agent 104 and communicates with the SNMP manager 102 via a request-response interaction path 112 effectuated by means of SNMP. Further, the SNMP master agent 104 is also provided to be operable with the Agent Extensibility (AgentX) protocol in accordance with the teachings of the present invention. One or more processing entities operating as subagents are provided within the framework of the AgentX protocol that can communicate with the SNMP master agent 104 via AgentX paths (collectively labeled as reference numeral 114). For example, an AgentX path 116 is provided between subagent 106 and the SNMP master agent 104.

As provided in the AgentX governing specification, RFC 2741 (which is incorporated by reference herein), the master agent 104 sends and receives SNMP messages in its interactions with the SNMP manager 112, but typically has little or no direct access to management information of the managed node 101. It is the AgentX subagents (which are shielded from the SNMP protocol messages) that are provided with management instrumentation necessary for accessing at least a part of the management information. Accordingly, the subagent 106 may be provided with instrumentation responsible for a particular component of the managed entity 101.

At least a portion of the management information of the node 101 (relating to yet another specific component thereof) is supported by and associated with a "pure" SNMP agent (e.g., agent 110) rather than the AgentX subagents provided in the management system 100. However, the SNMP agent 110 is not directly "visible" to the SNMP master agent 104. In accordance with the teachings of the present invention, an AgentX subagent operates as a "proxy" for such agents which may be internal to the managed node 101 or disposed external thereto, having a separate UDP port. For example, a proxy subagent (PSA) 108 is exemplified herein which is disposed between the SNMP master 108 and the SNMP agent 110. An AgentX path 118 is available for communication between the PSA 108 and the master agent 104. Similarly, an SNMP path 120 is provided between the PSA 108 and the SNMP agent 110.

The PSA 108 may be preferably provided as a software executable running the AgentX protocol (as specified in RFC 2741) for communicating internally to the SNMP master 104 via AgentX messages and to another SNMP agent (which may be referred to as an SNMP peer agent, e.g., agent 110) via SNMP messages. Preferably provided with the PSA 108 is the capability to register with the master agent 104 at least a portion of the SNMP MIB that is to be supported by the SNMP agent 110. Accordingly, the PSA 108 operates as a relay for the SNMP PDUs or packets generated by the SNMP master 104 with respect to the MIB portion supported by the SNMP peer agent 110.

Figure 2:
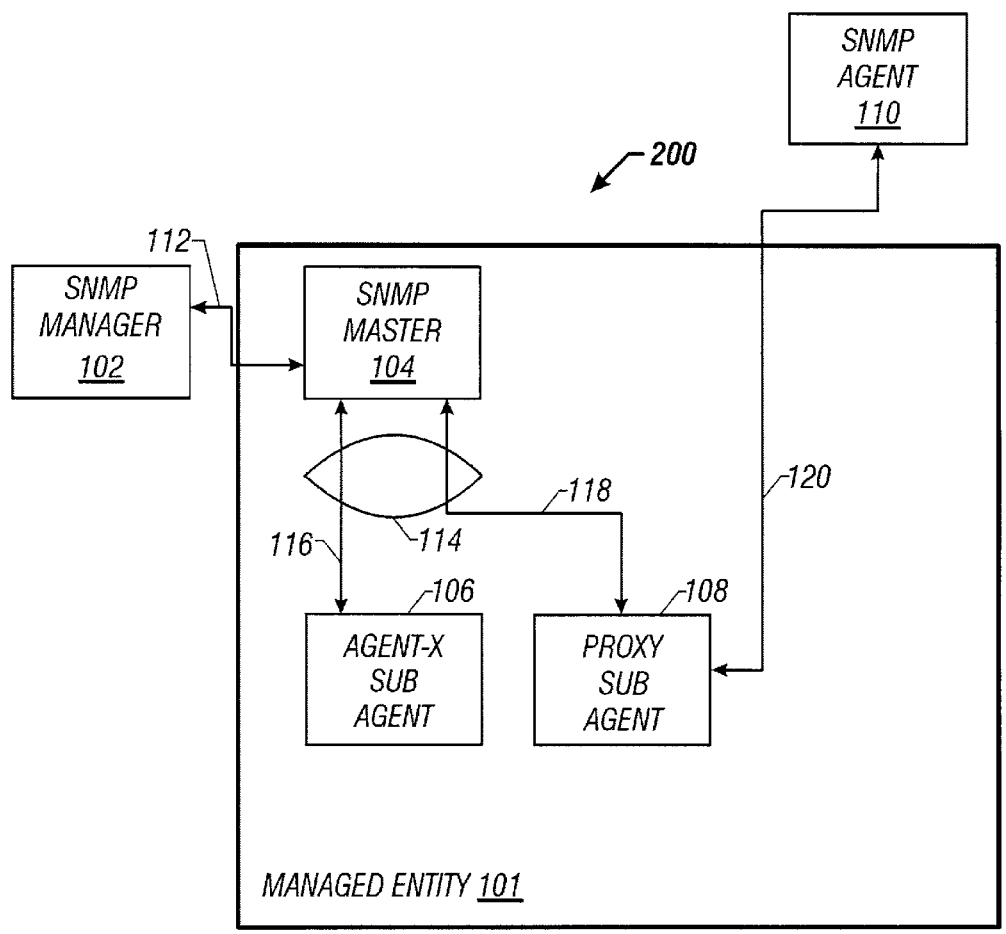
FIG. 2 depicts a functional block diagram of another exemplary embodiment of a node management system provided in accordance with the teachings of the present invention for managing a node.

Referring now to FIG. 2, depicted therein is another exemplary embodiment of a management system 200 provided for the managed entity node 101. Those skilled in the art should readily appreciate that the management system 200 is essentially similar to the management system 100 described in detail hereinabove. Accordingly, only some of the salient features thereof are set forth below.

The SNMP peer agent 110 is preferably provided as an external agent in the management system 200 wherein it is coupled to the managed entity node 101 via appropriate network means. The PSA 108 is accordingly configured to communicate with the external peer agent 110 via the SNMP path 120 using a remote network address, e.g., an IP address, associated with the external agent, rather than using a localhost address. It should be appreciated by those skilled in the art that the arrangement of the management system 200 in FIG. 2 is particularly advantageous for setting up test configurations where the external agent is an agent simulator.

Figure 3:
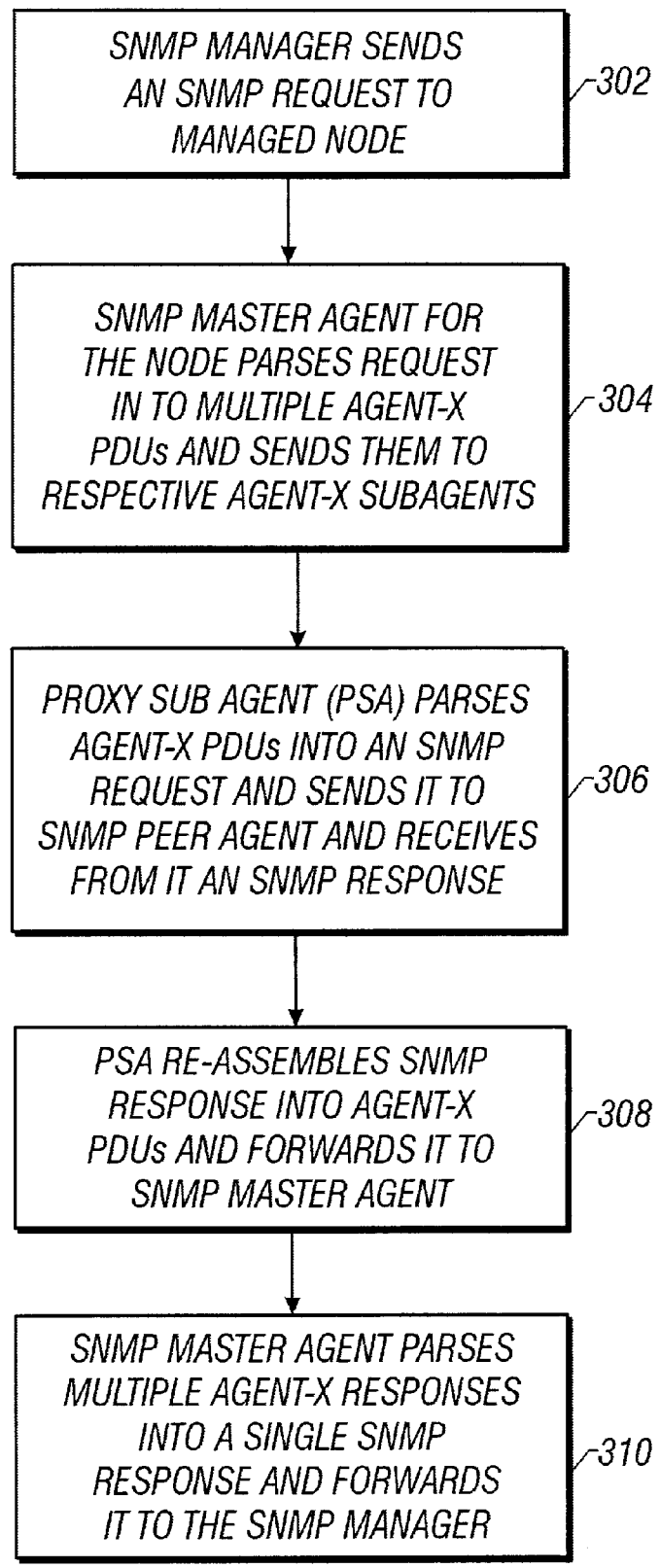
FIG. 3 depicts a flow chart of an exemplary network management method provided in accordance with the teachings of the present invention.

FIG. 3 is a flow chart of an exemplary network management method of the present invention. The SNMP manager of a management system sends a single SNMP request to the SNMP master agent provided for the managed node (step 302). In response thereto, the master agent parses the SNMP request into one or more AgentX request PDUs or packets and sends them to respective AgentX subagents associated therewith (step 304). As will be explained in greater detail hereinbelow, a PSA provided in the management system registers a pre-defined portion of the MIB that is supported by an SNMP peer agent. Accordingly, when an AgentX packet is received from the master agent relative to an object supported by the peer agent, the PSA parses or re-assembles it into an SNMP request packet and sends it to the SNMP peer agent (step 306). Subsequently, when the PSA receives an SNMP response packet therefrom, it parses it into an AgentX packet and forwards it towards the SNMP master agent (step 308). Thereafter, the SNMP master agent multiplexes all AgentX responses received from the AgentX subagents into a single SNMP response message and forwards it towards the SNMP manager (step 310).

It should be readily appreciated that the network node management system and process set forth above provides for the ability to concurrently run multiple SNMP peer agents on a single machine and have them appear to be a single agent to an SNMP manager without having to use special community strings or separate UDP ports, which the manager is conventionally required to be aware of. In addition, the management communication process set forth hereinabove is advantageously operable with both external SNMP managers as well as internal SNMP managers (i.e., self-managed nodes).

Figure 4:
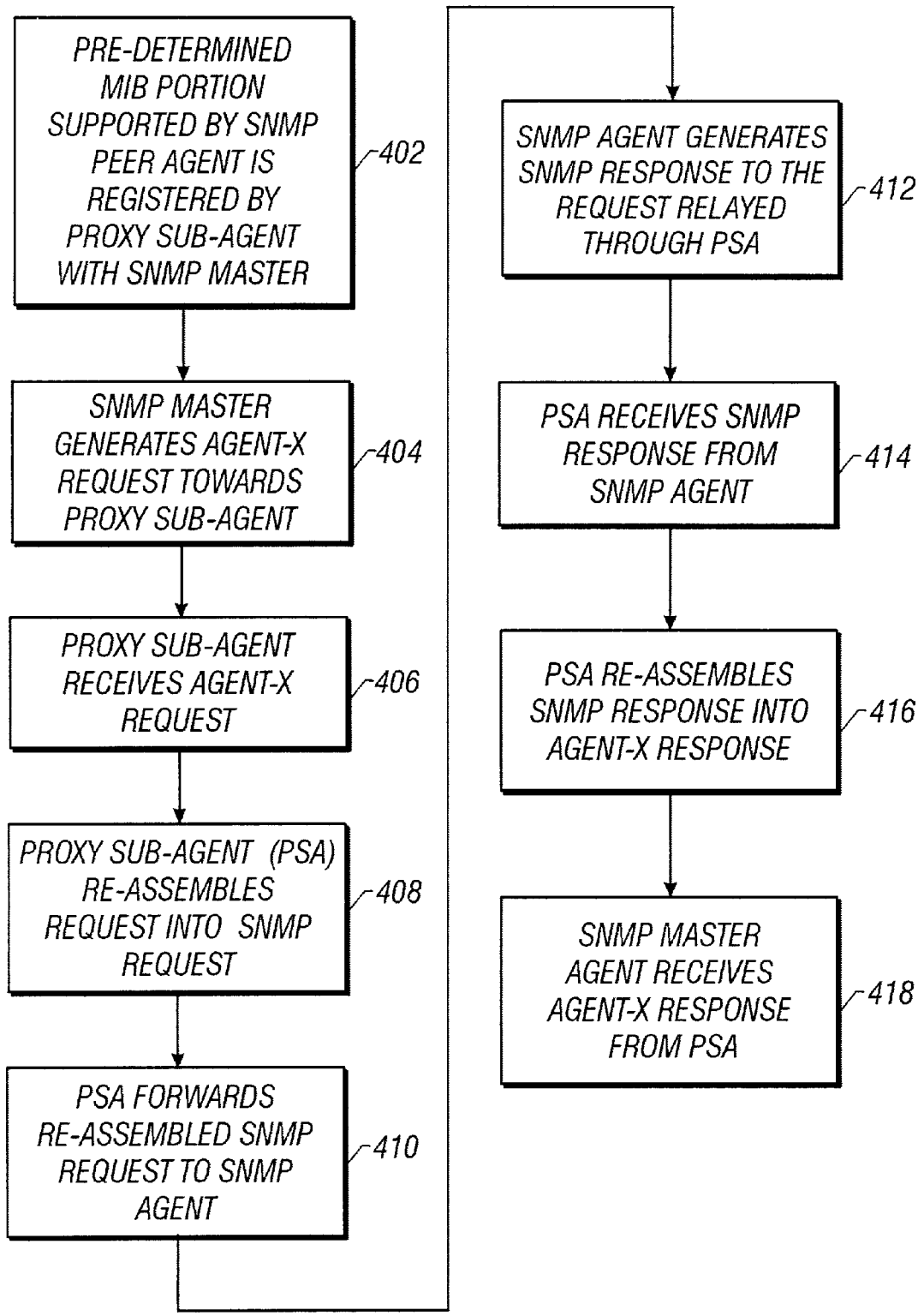
FIG. 4 depicts a flow chart of the steps involved in an exemplary method of effectuating management communication between an SNMP master agent and an SNMP peer agent involved in a management system of the present invention.

FIG. 4 depicts a flow chart of the steps involved in a method of effectuating management communication using a PSA disposed between an SNMP master agent and an SNMP peer agent in a management system of provided in accordance with the teachings of the present invention. As briefly alluded to in the foregoing description, a predetermined MIB portion supported by the SNMP peer agent is registered by the PSA with the SNMP master agent by way of an AgentX registration packet (step 402). When AgentX PDUs generated by the master agent are received in the PSA (steps 404 and 406), appropriate method routines associated therewith (i.e., get, getNext, Test, and Set routines) are used to re-assemble them into SNMP PDUs (step 408). Essentially, the varbind list or lists provided with the AgentX messages are manipulated by the PSA's method routine (or routines) to create SNMP-compatible varbind list(s) for SNMP transmission to the peer agent. Accordingly, the PSA's functionality may be seen to include "protocol converter" functionality to facilitate the PDU conversion involved in the management communication process of the present invention.

Preferably, a MIB portion created for the PSA is provided as a single leaf object. For example, in the case where a PSA is built for an agent which simulates the complete node, this leaf object may be 1.3.6.1.2.1. The PSA registers this leaf object as the portion of the MIB which it supports. When an SNMP get PDU is received for 1.3.6.1.2.1. 2.2.1.2, the master agent forwards it to the PSA in an AgentX PDU. Thereafter, the PSA groups all objects within this table into a single method routine call, whereupon the object and instances for each varbind are concatenated to re-create the varbinds requested in the original get message. This re-created packet may be sent as a transport datagram to the peer agent based on a predefined IP address and UDP port number (step 410). Compile options that are configurable at run time may also be preferably provided at this juncture.

Upon receiving the re-assembled SNMP message, the SNMP peer agent generates an appropriate response PDU which is relayed back to the PSA (step 412). Once the SNMP response PDU is received in the PSA (step 414), a re-conversion process is engaged to re-assemble an AgentX response PDU based thereon (step 416). Thereafter, the PSA forwards the AgentX response message to the SNMP master agent of the management system (step 418).

Figure 5:
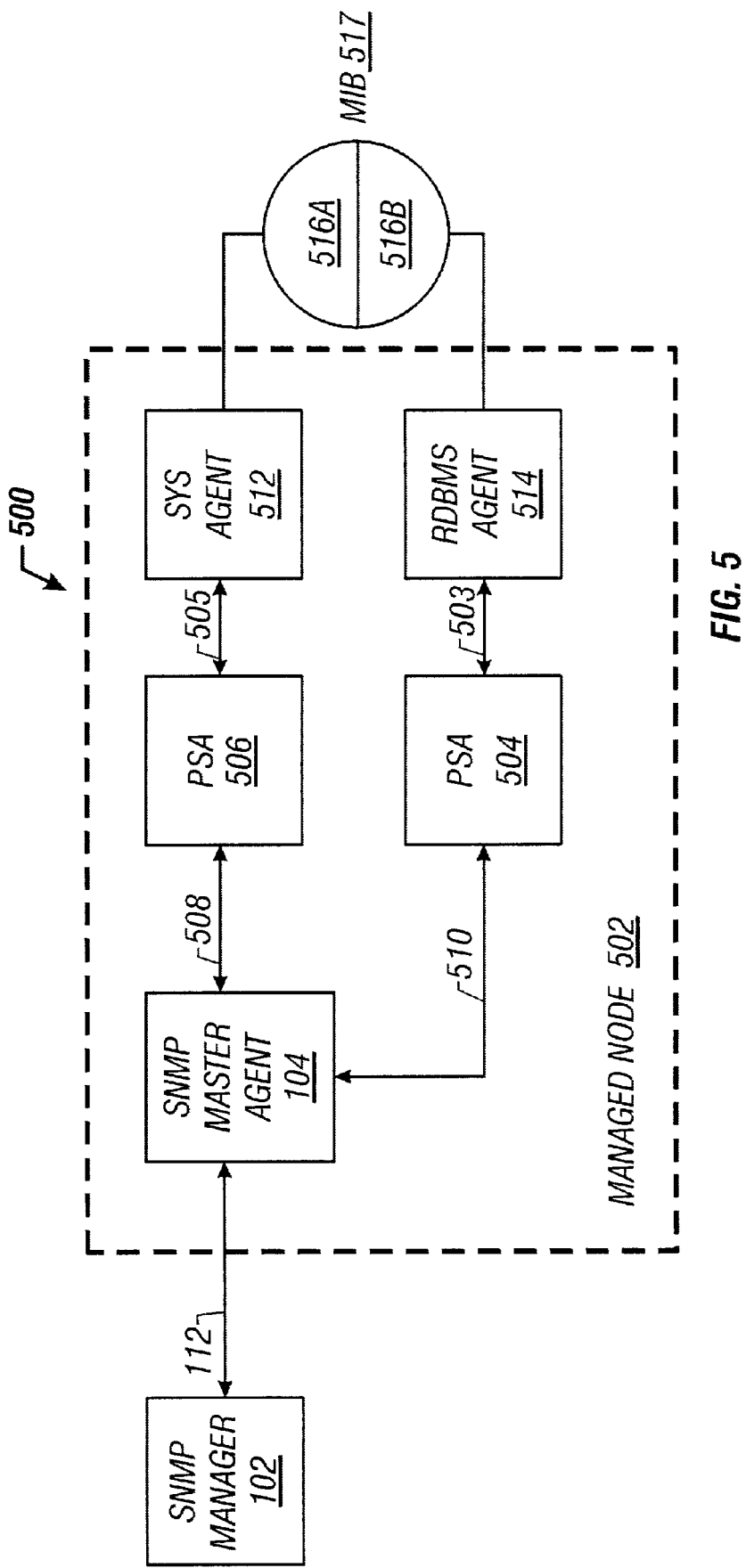
FIG. 5 depicts an exemplary practical embodiment of a node managed in accordance with the teachings of the present invention.

Referring now to FIG. 5, depicted therein is an exemplary embodiment of a node 502 managed in accordance with the teachings of the present invention in practice. The managed node 502 is preferably provided with a relational database management system (RDBMS) that is supported by an appropriate RDBMS MIB (reference numeral 516B) which may form a portion of the MIB 517 associated with the managed node 502. System functionality of the managed node 502 is instrumented via a system MIB portion 516A of the MIB 517. The SNMP manager 102 is provided to manage both the system functionality as well as the RDBMS functionality as a single managed entity without having to control two separate SNMP agents independently. A system PSA 506 and an RDBMS PSA 504 are provided in the management system 500 which can register the MIB portions with the master agent on behalf of the SNMP agents 512 and 514, respectively. For example, the OID for the RDBMS MIB 516B is registered by means of an AgentX registration packet sent via an AgentX path 510 disposed between the PSA 504 and the master agent 104.

After the PSA 504 has registered the OID for the RDBMS MIB 516B, any requests from the manager for objects in that MIB are parsed into AgentX messages directed to the PSA 504. Thereafter, by means of a configured UDP port and IP address, messages re-assembled in accordance with the teachings of the present invention are provided by the PSA 504 to the RDBMS agent 514.

Figure 6:
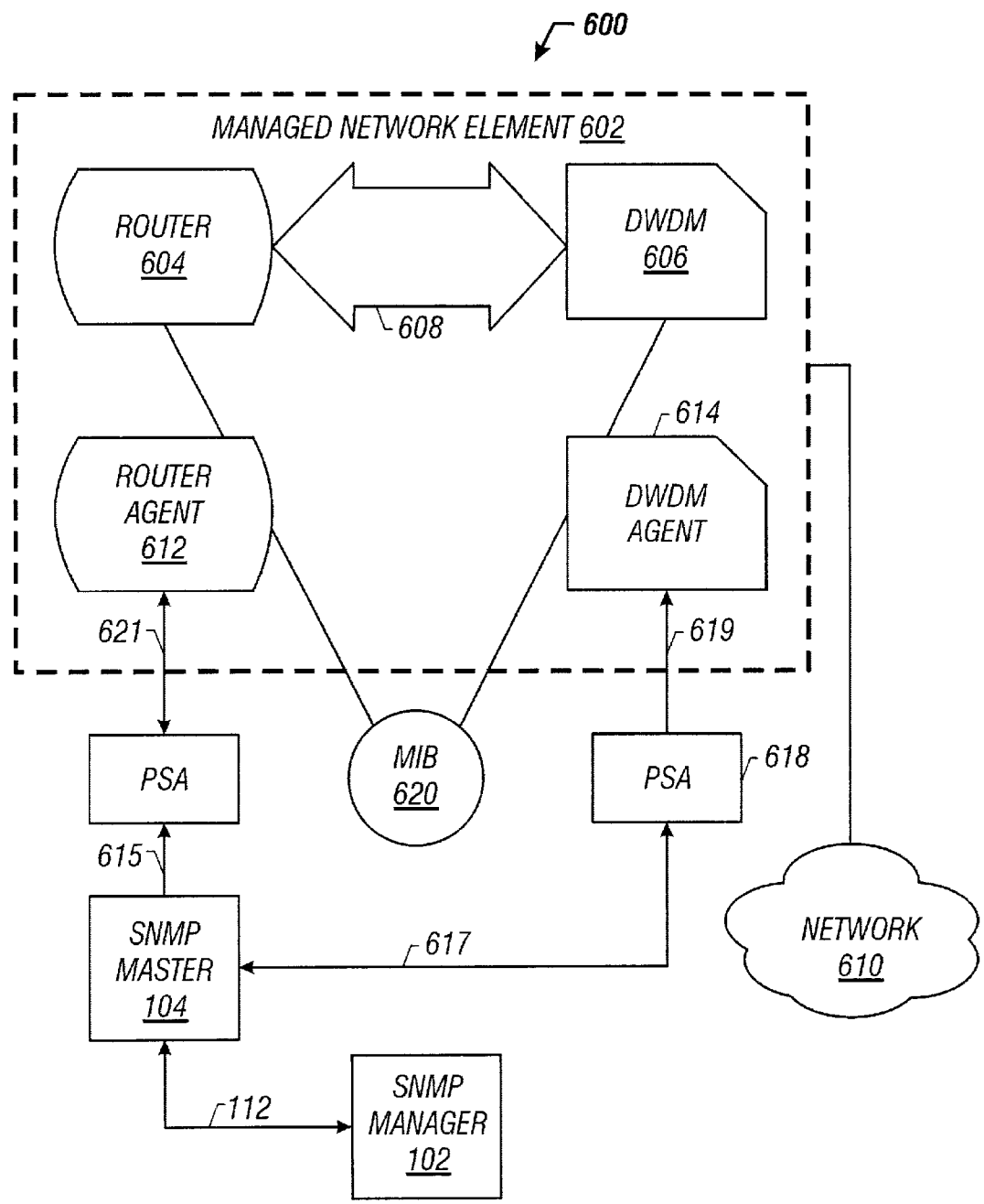
FIG. 6 depicts another exemplary practical embodiment of a node managed in accordance with the teachings of the present invention.

FIG. 6 depicts a management system 600 for managing a telecommunications node 602 disposed in a network 610, wherein the node 602 is exemplified as a network element having a router 604 (e.g., an IP router) integrated with a Dense Wavelength Division Multiplexer (DWDM) 606. A MIB 620 is provided for instrumenting the node 602 as a single managed network element, although the router and DWDM are provided as two separate components coupled via path 608, each with its own separate power and network access. For example, the two devices may have been built by two divisions within a single corporation as compatible hardware components that can co-reside in the same chassis (i.e., co-located components).

In accordance with the foregoing teachings, PSA 616 and PSA 618 are provided for registering the MIBs supported by the router and DWDM SNMP agents 612 and 614, respectively. The SNMP manager 102 can thereafter use the SNMP master 104 to manage the node 602 as a single network element. The SNMP messages from the manager 104 are parsed and re-parsed as set forth hereinabove to effectuate management communication for the entire node.

Based upon the foregoing Detailed Description, it should be readily apparent that the present invention provides an advantageous solution for supporting multiple SNMP agents in a single platform with the capability to inter-operably accommodate the AgentX protocol. Furthermore, as fully functional AgentX subagents are developed which can encompass the functionality of the PSAs and their SNMP agents, a single AgentX subagent can be used to replace the PSA and the proxied agent with little or no modification to the rest of the managed node or the management system. By using PSAs as set forth hereinabove, accordingly, legacy SNMP agents developed by a host of third-party vendors that are currently available for myriad network devices can continue to be used within the AgentX framework without detracting from developing full-fledged AgentX functionality.

By practice of the present invention, additional MIB objects can be dynamically defined in the PSA to allow objects such as the system group on the proxied device to appear as leaf objects from the master agent. Additional logic can also be added to the PSAs to scan the table data pertaining to the proxied devices so that table objects such as interfaces may be registered, whereby a single interface table on the SNMP master agent can represent interfaces for both its own interfaces as well as the interfaces for proxied devices.

It is believed that the operation and construction of the present invention will be apparent from the foregoing Detailed Description. While the method and apparatus shown and described have been characterized as being preferred, it should be readily understood that various changes and modifications could be made therein without departing from the scope of the present invention as set forth in the following claims.

What is claimed is:

1. In a network management system for managing a node including a Simple Network Management Protocol (SNMP) master agent and at least one SNMP peer agent, wherein said master agent is operable with the Agent Extensibility (AgentX) protocol and said peer agent is operable with the SNMP, a method of effectuating management communication between said master agent and said peer agent via a proxy subagent (PSA), comprising the steps of:

registering, by said PSA at said master agent, a predefined portion of a Management Information Base (MIB) associated with said managed node;

determining if said predefined portion of said MIB is supported by said peer agent, and if the determination is in the positive;

receiving by said PSA a plurality of AgentX packets from said master agent, said plurality of AgentX packets relating to a request by said master agent directed towards accessing said predefined portion of said MIB;

re-assembling said AgentX packets by said PSA into a plurality of SNMP packets;

forwarding said plurality of said SNMP packets by said PSA to said peer agent;

responsive to said SNMP packets received from said PSA, operating by said peer agent with respect to said predefined portion of said MIB and generating an SNMP response message;

receiving by said PSA said SNMP response message from said peer agent;

re-assembling said SNMP response message by said PSA into a plurality of AgentX response packets; and forwarding said plurality of AgentX response packets to said master agent.

2. The method of effectuating, management communication in a network management system for managing a node as set forth in claim 1, wherein said registering step is effectuated by forwarding an AgentX registration packet containing an object identifier (OID) associated with said predefined portion of said MIB.

3. The method of effectuating management communication in a network management system for managing a node as set forth in claim 1, wherein said request by said master agent is generated in response to an SNMP management command by an SNMP manager.

4. The method of effectuating management communication in a network management system for managing a node as set forth in claim 3, wherein said master agent and said peer agent are co-located at said node.

5. The method of effectuating management communication in a network management system for managing a node as set forth in claim 3, wherein said peer agent is remotely disposed with respect to said master agent.

6. The method of effectuating management communication in a network management system for managing a node as set forth in claim 3, wherein said SNMP manager is external to said managed node.

7. The method of effectuating management communication in a network management system for managing a node as set forth in claim 3, wherein said SNMP manager is internal to said managed node.

* * * * *